United States Patent [19]

Frees et al.

[11] 4,394,106
[45] Jul. 19, 1983

[54] GLASS HANDLING LIFT TRUCK

[75] Inventors: Kenneth A. Frees, St. Peters; Thomas E. Quick, Florissant, both of Mo.

[73] Assignee: Missouri Research Laboratories, Inc., St. Charles, Mo.

[21] Appl. No.: 295,829

[22] Filed: Aug. 24, 1981

[51] Int. Cl.³ .............................................. B66F 9/14
[52] U.S. Cl. ................................... 414/622; 414/635; 414/663; 414/11; 294/67 AB
[58] Field of Search ................. 414/627, 11, 621, 622, 414/623, 589, 590, 607, 635, 663, 672; 294/65, 67 AB

[56] References Cited

U.S. PATENT DOCUMENTS

| 3,361,280 | 1/1968 | Traver | 414/11 X |
| 3,598,263 | 8/1971 | Ehmke | 414/607 X |
| 3,738,518 | 6/1973 | Outsen, Jr. | 414/627 |
| 3,971,585 | 7/1976 | LaBudde | 414/621 X |

FOREIGN PATENT DOCUMENTS 1316425 of 1963 France ................................ 414/627

Primary Examiner—Robert J. Spar
Assistant Examiner—Terrance L. Siemens
Attorney, Agent, or Firm—Kalish & Gilster

[57] ABSTRACT

A lift truck mechanism for handling glass sheets having a glass pack lifting frame. Gripping devices at the sides of the lifting frame engage sides of a glass pack. Feet at the bottom of the lifting frame support the glass pack on the frame. A framework of the mechanism attaches it to the lift mast of the lift truck, there being an operator control station platform extending rearwardly from the lifting frame above the lift mast. An intermediate frame is carried by the framework in selectively extendable relationship in front of the mast and there is a first pair of swinging frames swingably affixed to the intermediate frame for swinging movement on upright axes at the opposite sides of the intermediate frame. A second pair of swinging frames is provided, swingably affixed at proximal ends to the distal ends of the first pair of frames. Distal ends of the second pair of frames are pivoted to the lifting frame. A drag link interconnects the distal ends of the first pair of frames. First and second sets of hydraulic cylinders, respectively, effect side-shifting and slewing movements of the lifting frame relative to the lift truck.

8 Claims, 4 Drawing Figures

GLASS HANDLING LIFT TRUCK

BACKGROUND AND SUMMARY OF THE INVENTION

The present invention relates to industrial trucks and, particularly, to a lift truck mechanism for handling large sheets of glass.

Lift trucks for stacking and loading of large sheets of glass, which may be referred to as glass handling trucks or merely "glass trucks," have been utilized heretofore for transporting large packs of sheets of glass from one place to another, as in glass manufacturing and storage facilities. In such locations, the sheets are stacked and oriented for stacking in an upright condition. When the sheets are to be transferred from one location to another, it has been the practice in using such trucks to maneuver to a pack of sheets, pick up the pack by the sheet edges while maintaining the upright condition of the sheets, and then relocate the pack of sheets to a storage location or place it accurately on a specially designed pallet (on which it is to be stacked against adjacent sheets in face-to-face relationship on edge).

Because of the danger of breakage of large sheets of glass, which typically may have a width of 20 feet and height of 12-13 feet, in the form of packs of sheets of several inches thickness, glass trucks have been heretofore configured to provide an operator station or so-called bridge located atop the truck and above the mast of the lift mechanism. On such a bridge, the operator is provided with controls for full operation of the truck and has good forward visibility. But, more importantly, the operator is in a location of relative safety to prevent injury in the event of breakage of a sheet or sheets of glass.

Great accuracy is required in placing packs of sheets of glass with such a truck, not only to avoid breakage from handling stresses but also to avoid any misalignment providing unstable stacking of the sheets with consequent risk of sheets slipping or falling from the stack. Such could result in an extremely dangerous condition posing serious potential for death or injury. Lateral positioning of the sheets is required to an accuracy of less than an inch and with the vertical alignment or leveling preferably within an accuracy of ±0.5°.

Because of their large size, glass trucks have required precise, difficult and time-consumming maneuvering, with the driver sometimes being required to jockey the truck or "back and fill," i.e., repetitively to maneuver the truck in and out to orient it for placing or picking up glass sheets accurately.

Accordingly, it is an object of the invention to provide a glass handling lift truck, or so-called glass truck, and lift mechanism for extremely convenient and highly accurate placement and orientation of glass sheets, as in the form of so-called glass packs.

It is a further object of the invention to provide such a glass truck lift mechanism which is not only extensible and retractable (i.e., movable from front to rear) and controllably liftable but which, in accordance with the invention, is controllably laterally shiftable from side to side as well as slewable to provide azimuthal orientation for purposes for picking up or depositing, i.e., placing, sheets of glass.

Another object of the invention is the provision of such a lift truck mechanism which avoids or reduces the need for the operator to maneuver the truck in a difficult, time-consumming manner for lifting up or depositing glass sheets; and which effectively allows the operator to simply bring the truck into proximity to a loading location, brake it to a stop, and thereafter relocate only the lifting mechanism for lifting up or depositing glass packs.

Another object of the invention is the provision of such a glass truck lift mechanism utilizing a simple arrangement of hydraulic cylinders for effecting both shifting and swinging of the lift mast.

A further object of the invention is the provision of such lift mechanism for use on an existing industrial lift truck which is readily mounted on the truck for conversion thereof for glass handling purposes.

Among other objects of the invention are the provision of such a lift truck and lift mechanism which are constructed with a minimum of mechanical components while providing great strength for safe handling of heavy glass loads.

Other objects and features will be in part apparent and in part pointed out hereinbelow.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
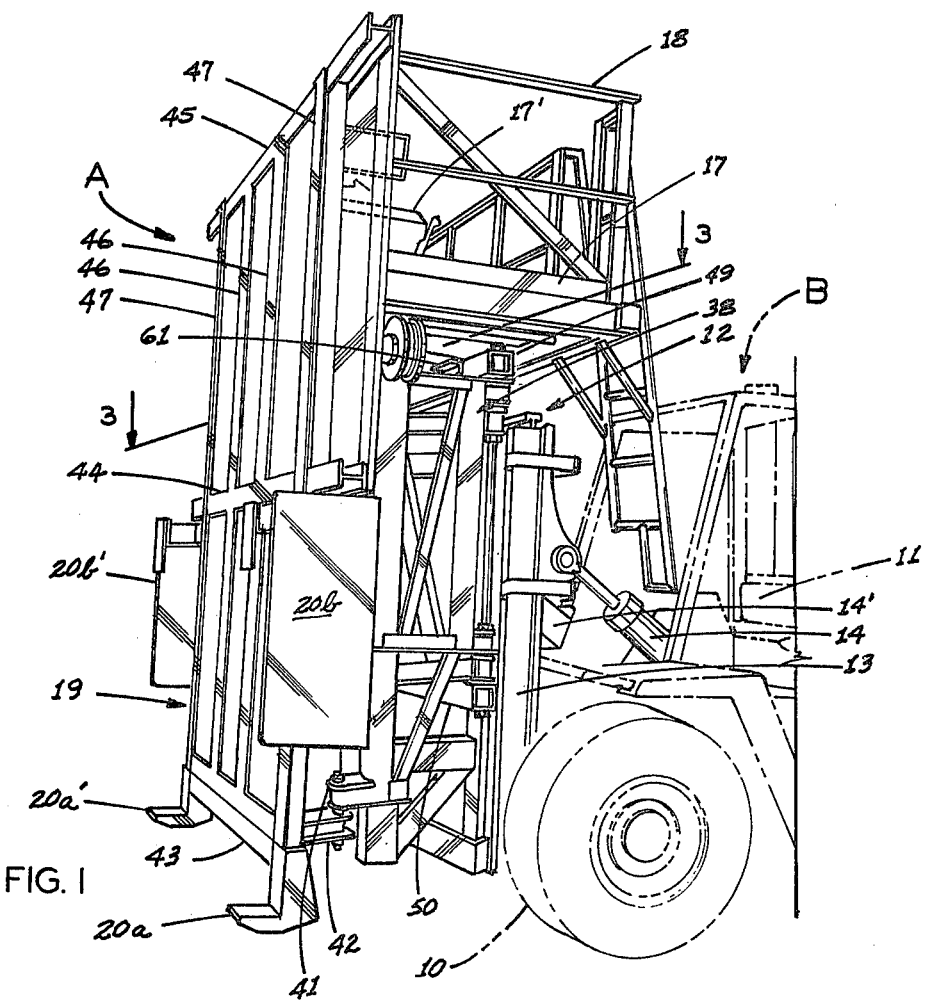
FIG. 1 is a perspective view of a glass pack lifting mechanism and portions of a lift truck on which the lifting mechanism is mounted.

Referring now by reference characters to the drawings, illustrated generally at A is a lift mechanism for lifting and depositing glass packs. Mechanism A is carried by a lift truck B having a chassis of conventional design. Such glass packs typically consist of 20-40 large, flat sheets of glass, each being representatively 20 feet wide by 12-13 feet high, and with the packs being several inches in thickness.

Truck B may conventionally have large, non-steerable main from wheels as at 10 and steerable rear wheels (not shown) which normally would be controllable by an operator at a control position 11. However, in the equippage of truck B with lift mechanism A, position 11 is not used since the driver would be unable to see around or through a large, thick pack of glass sheets carried by the truck and would be exposed to danger from breakage of glass.

There is provided on said truck B a main lifting mast, generally designated 12, having upright beams 13, 13' which are pivotally mounted to the truck chassis at their lower ends and which may be tilted forward or backward by hydraulic cylinders 14, 14'. Interengaged with beams 13, 13' by conventional rollers (not shown) are liftable mast beam members 15, 15' adapted to be raised or lowered by known mechanism such as a hydraulic cylinder. Lift mechanism A is carred by beams 15, 15' and thus the entire lift mechanism A can be controllably raised or lowered by the operator, as well as tilted in a vertical plane by operation of cylinders 14, 14'.

Carried atop lift mechanism A is an operator platform 17 surrounded by a protective railing 18 and providing a safe control station for the operator above mast 12 at which there is unobstructed forward vision and a clear view of the glass pack load. Suitable remote controls (not shown), preferably of known electric servo type for extremely precise maneuvering and positioning of mechanism A and truck B, are located for access from platform 17, as at a control console 17'.

Figure 2:
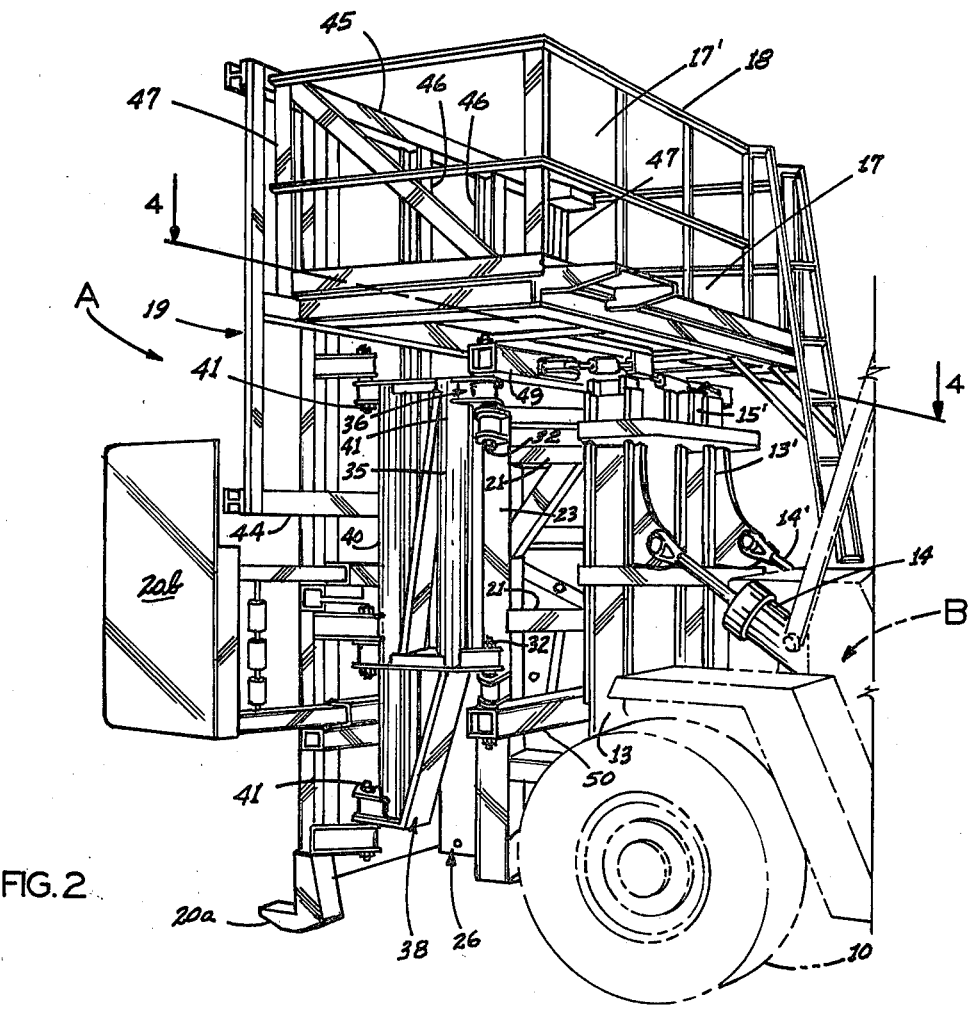
FIG. 2 is a perspective from another direction of the lifting mechanism and salient portions of the lift truck.

With reference still to FIGS. 1 and 2, lift mechanism A comprises a lifting frame generally designated 19 carried upright at the front of the truck and having width and height greater than glass packs to be lifted, and with there being a pair of short lifting forks, or feet, 20a, 20a' for extending under a package of glass to be lifted and clamp pads, or arms, 20b, 20b' for grippingly engaging the sides of a glass pack for holding same affixed to frame 19 during movement. Platform 17 is a rearward structural extension of frame 19.

Figure 3:
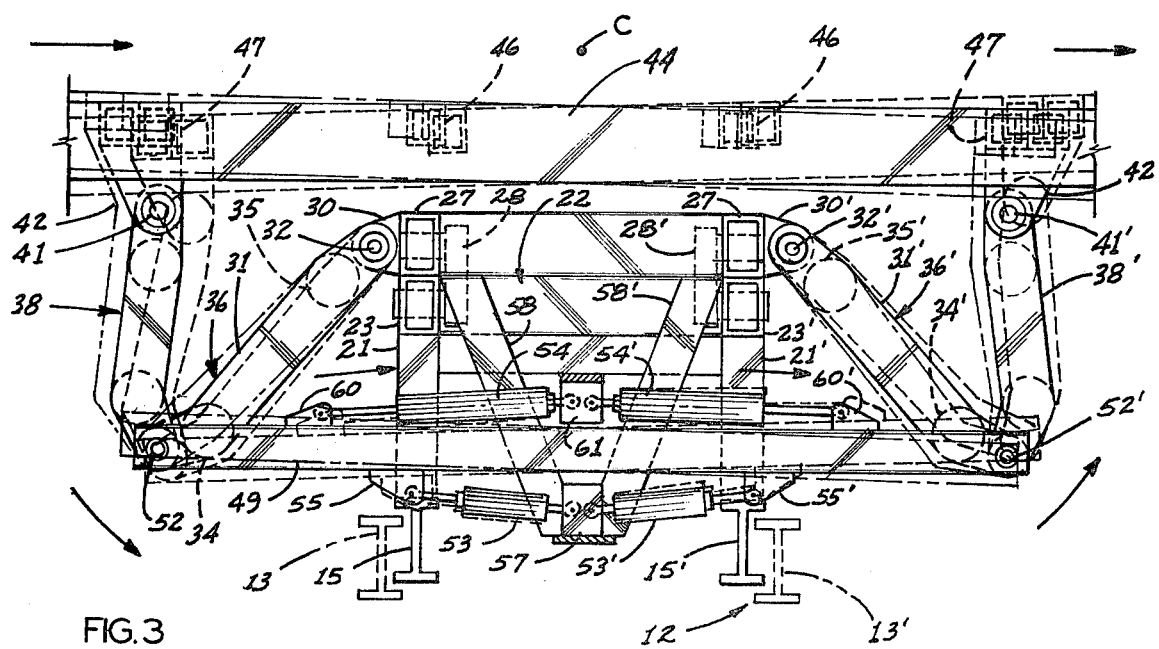
FIG. 3 is a horizontal cross-section of the lifting mechanism taken generally along line 3—3 of FIG. 1.
Figure 4:
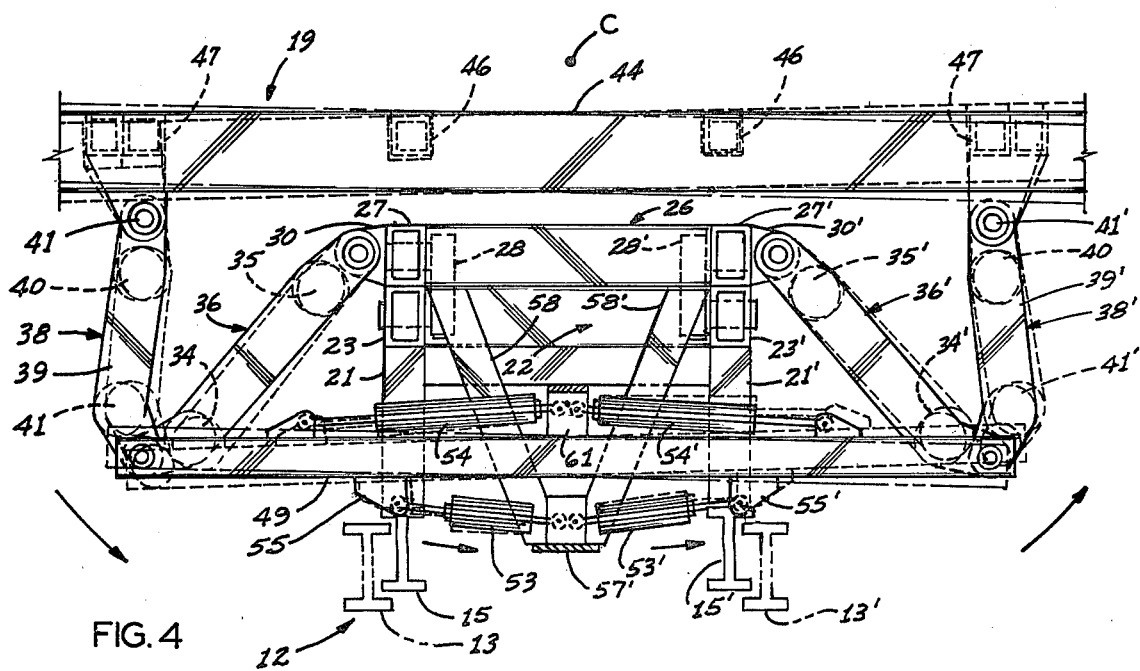
FIG. 4 is a similar horizontal cross-section of the lifting mechanism taken generally along line 4—4 of FIG. 2.

The manner in which lift mechanism A is carried by mast 12 is now discussed. Referring now particularly to FIGS. 3 and 4, extending forwardly from beans 15, 15' are upper and lower pairs of frame extensions, as at 21, 21', by which are carried a so-called dummy mast 22 comprised of suitably braced and parallel vertical members 23, 23'. Mast 22 manifestly constitutes an extension of mast 12 and moves up and down with the latter, as well as being similarly tiltable from and toward truck B through extension and retraction of cylinders 14, 14'. Additional reach is thus provided but a lift mechanism of the invention may be designed to eliminate the dummy mast.

Reference numeral 25 generally designates an intermediate frame 26 comprised of parallel vertical members 27, 27' of the same general tubular character as members 23, 23' and aligned with the latter. Horizontal cross bracing, as appropriate, bridges members 27, 27', which are connected to members 23, 23' by upper and lower sets of links 28, 28' which are pivotally joined at their opposite ends to the corresponding members 23, 27 and 23', 27'. Further, the links are oriented in an angled relationship to the intermediate frame members 27, 27' and dummy mast members 23, 23', being preferably such that, when mast 22 and frame 26 are as shown in the drawings, the links extend downwardly from their points of attachment to mast 22.

Further, an appropriate cylinder (or cylinders), although not shown, provides interengagement between mast 22 and frame 26 so that lengthening or shortening of such cylinder will cause the spacing between frame 26 and mast 22 to vary, permitting frame 26 to be extended from mast 22 by a distance corresponding to the length of links 28, 28'. Such extension arrangement is not per se novel and its design features are within the capability of the ordinarily skilled designer. Also, other arrangements for controlling the extension of frame 26 from mast 22 will be apparent to those skilled in the art. For example, links 28, 28' may themselves be extensible, as by being constituted by hydraulic cylinders.

Referring still to FIGS. 3 and 4, there are provided extensions, as at 30, 30', at opposite sides of frame 26 to which are pivotally attached to frame 26 sets of arms, two of which are designated 31, 31'. It is important to observe that there are actually upper and lower pairs of such arms pivotally hinged on pins, as shown at 32, 32', and with the upper and lower arm at each side being joined by vertically oriented parallel tubular members 34, 35 and 34', 35', thus providing swingable frames, generally 36, 36', opposite sides of intermediate frame 26, each free to pivot on an upright axis on the respective side of frame 26, as defined by the corresponding pin 32, 32'.

The outer, or distal, end of frames 36, 36' are in turn affixed to similar frames 38, 38' constituted by upper and lower transverse arms, as at 39, 39' and tubular, vertically-oriented parallel members 40, 41 and 40', 41'. The rearward ends of frames 38, 38' (as viewed in FIGS. 3 and 4) are pivotally affixed to the respective outer ends of frames 36, 36' in variable angular relationship, whereby frames 38, 38' respectively constitute extensions of frames 36, 36', and are swingable relative to frames 36, 36'.

The forward, distal ends of frames 38, 38' are pivotally connected by upper and lower pins 41, 41' to frame 19 by extensions 42, 42' rearwardly from the structural members of frame 19. The latter is defined by three transverse beams 43, 44, and 45 and a plurality of upright members, as at 46, 47, to provide a strong, flat framework against which glass packs are stably supported, when lifted by feet 20a, 20a' and clamped in position by clamp arms 20b, 20b'.

Accordingly, it is now seen that frame 19 is supported in front of intermediate frame 26 at the forward ends of frames 38, 38' and with movement being permitted by pivoting of frames 36, 36' at their points of pivotal connection to frame 26. Further, the distal ends of frames 36, 36' are connected by upper and lower drag links 49, 50 which are pivotally affixed at their opposite ends to the point of joinder of the respective pairs of frames, 36, 38 and 36', 38', as at 52, 52'. Therefore, the distance between the pivotal connections 52, 52' is fixed whereby there is provided, in effect, a parallelogram linkage permitting both side shifting and slewing movement of frame 19.

Such movement is controlled by sets of hydraulic cylinders 53, 53' and 54, 54'. The former each have one end connected to a respective bracket 55' affixed to common drag link 49. The other end of each of cylinders 53, 53' is connected to the central portion 57 of a V-shaped bracket having a pair of arms 58, 58' secured at their forward ends to dummy mast 22. Therefore, it is seen that extension of one of cylinders 53, 53' and contraction of the other will produced shifting of drag link 49 left or right with respect to truck mast 12. Drag links 49, 50 always are parallel to frame 19.

The other set of cylinders 54, 54' are similarly connected at their outer ends to brackets 60, 60' affixed to drag link 49, and inner ends by connection to a bracket 61 which is affixed to the framework of platform 17. Therefore, extension of one of cylinders 54, 54' and corresponding contraction of the other will produce shifting of drag link 49 relative to platform 18. Bracket 61 is, in effect, a rearward extension of frame 19, to which platform 18 is secured.

As a result of this ususual geometry, cylinders 54, 54' produce a side shifting movement of frame 19 relative to truck B, as shown by dashed lines of FIG. 3. Cylinders 53, 53' impart a rotational movement of drag link 49 relative to the truck chassis for slewing of frame 19 relative to truck B. Such slewing movement is shown by dashed lines in FIG. 4, with rotation about an instantaneous center C in front of frame 19. Point C is selected such as to mimmize lateral load displacement such as at the forward face of the glass pack.

As previously alluded to, truck mast 12 provides for operator control of the height of lift mechanism A. The operator is also provided with the capability of extending intermediate mast 26 forwardly relative to the dummy mast 22. Servoelectric controls are preferred to allow virrtually infinite adjustment of the extension and retraction of the various hydraulic cylinders which control mast tilting, lifting, extension of frame 26 as well as cylinders 53, 53' and 54, 54' which control the slewing and side shifting movements explained above.

Because of the operator control thus provided, allowing all possible for the frist time for a glass truck operator to position the truck in proximity to a loading location, brake it to a stop, and thereafter relocate lifting mechanism A for positioning of frame 19 as explained above for the purpose of either lifting up or depositing glass packs. Heretofore, operators of glass trucks were required to carefully maneuver the truck in a time-consumming, repetitive and delicate manner until the glass lifting frame was positioned for lifting or depositing glass packs. This greatly increased risk of breakage as well as added costs and time required for handling of glass packs.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. For use with a lift truck, a lift truck mechanism for handling glass sheets in packs comprising a glass pack lifting frame, gripping means at the sides of said lifting frame for engaging sides of a glass pack and support feet at the bottom of said lifting frame for supporting said glass pack, a framework of said mechanism for attachment to the lift mast of said truck, and further characterized by swinging frame means pivotally interengaging said framework and lifting frame to permit slewing and side-shifting movements of said lifting frame relative to said truck, first controllable motor means for effecting said side-shifting movement and second controllable motor means for effecting said slewing movement, said first motor means comprising first extendable-retractable hydraulic cylinder means effectively interengaging said framework and said swinging frame means, said second motor means comprising second extendable-retractable hydraulic cylinder means effectively interengaging said lifting frame and said swinging frame means, said swinging frame means including a first pair of oppositely disposed swingable frame members swingably engaged to said framework on opposite sides thereof and a second pair of oppositely disposed swingable frame members swingably interengaging distal ends of said first pair with said lifting frame, whereby said lifting frame may be controllably positioned both angularly and laterally relative to said truck for picking up and depositing glass sheets.

2. A glass handling lift truck mechanism according to claim 1 and further characterized by distal ends of said first pair of swinging frame members being connected by a drag linkage means, said first and second hydraulic cylinder means being connected at one end to said drag linkage means.

3. A glass handling lift truck mechanism according to claim 2 and further characterized by said first hydraulic cylinder means comprising a pair of oppositely disposed cylinders each having one end connected to said drag linkage means and an opposite end connected to said framework, said second hydraulic cylinder means comprising a further pair of oppositely disposed cylinders each having one end connected to said drag linkage means and an opposite end connected to a rearward extension of said lifting frame.

4. A glass handling lift truck mechanism according to claim 3 and further characterized by said rearward extension of said lifting frame comprising a framework providing an operator platform having controls to provide an operator control location, said platform being located atop said lifting mechanism and above said lift mast.

5. A glass handling lift truck mechanism according to claim 1 and further characterized by an intermediate frame positioned forwardly of said lift mast, a controllably extendable-retractable linkage interengaging said framework and said intermediate frame, said first pair of swingable frame members being swingably engaged to said intermediate frame, whereby extension or retraction of the last-said linkage provides corresponding extension or retraction of said lifting frame relative to said lift truck.

6. A glass handling lift truck mechansim according to claim 5 and further characterized by said framework constituting a structural forward extension of said lift mast, and including a dummy mast forwardly of said lift mast, said intermediate frame being interconnected with said framework by said extendable-retractable linkage.

7. A glass handling lift truck mechanism according to claim 1 and further characterized by said lifting frame slewing movement being constituted by rotation of said lifting frame about a center located forwardly of said lifting frame.

8. For use with a lift truck, a lift truck mechanism for handling glass sheets comprising a glass pack lifting frame, gripping means at the sides of said lifting frame for engaging sides of a glass pack and support feet at the bottom of said lifting frame for supporting said glass pack, a framework of said mechanism for attachment to the lift mast of said lift truck, an operator control station platform extending rearwardly from said lifting frame above said lift mast, and further characterized by an intermediate frame carried by said framework in selectively extendable relationship in front of said mast, a first pair of swinging frames swingably affixed to said intermediate frame for swinging on upright axes on the opposite sides of said intermediate frame, a second pair of swinging frames swingably affixed at proximal ends to the distal, intermediate frame-remote ends of said first pair of frames, and means pivotally interengaging distal ends of said second pair of frames to said lifting frame, a drag link interengaging the distal ends of said first pair of frames, first hydraulic motor means interengaging said framework and said drag link for selectively effecting side-shifting movement of said lifting frame relative to said lift truck, and second hydraulic motor means interengaging said platform and said drag link for selectively effecting slewing movements of said lifting frame relative to said lift truck.

* * * * *